United States Patent
Frietsch et al.

(10) Patent No.: US 8,199,671 B2
(45) Date of Patent: Jun. 12, 2012

(54) THROTTLING NETWORK TRAFFIC GENERATED BY A NETWORK DISCOVERY TOOL DURING A DISCOVERY SCAN

(75) Inventors: Thomas Frietsch, Sindelfingen (DE); Manfred Lutz, Gaertringen (DE); Thomas Trenz, Ehingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 268 days.

(21) Appl. No.: 12/241,728

(22) Filed: Sep. 30, 2008

(65) Prior Publication Data

US 2010/0080145 A1 Apr. 1, 2010

Related U.S. Application Data

(60) Provisional application No. 61/059,925, filed on Jun. 9, 2008.

(51) Int. Cl.
*H04L 12/28* (2006.01)

(52) U.S. Cl. .......... 370/254; 370/253

(58) Field of Classification Search .......... 370/229, 370/412, 392, 395.21, 468, 230–254; 709/223, 709/203, 224, 229, 107, 227
See application file for complete search history.

(56) References Cited

U.S. PATENT DOCUMENTS

| | | | |
|---|---|---|---|
| 6,067,545 A * | 5/2000 | Wolff | 1/1 |
| 6,262,976 B1 * | 7/2001 | McNamara | 370/254 |
| 6,578,077 B1 * | 6/2003 | Rakoshitz et al. | 709/224 |
| 6,628,616 B2 * | 9/2003 | Licht | 370/232 |
| 7,324,447 B1 * | 1/2008 | Morford | 370/231 |
| 7,457,883 B2 * | 11/2008 | Penk et al. | 709/231 |
| 7,472,185 B2 * | 12/2008 | Barry et al. | 709/224 |
| 7,554,983 B1 * | 6/2009 | Muppala | 370/392 |
| 7,561,520 B2 * | 7/2009 | Holloway et al. | 370/235 |
| 7,656,822 B1 * | 2/2010 | AbdelAziz et al. | 370/255 |
| 7,668,958 B2 * | 2/2010 | Burr | 709/227 |
| 7,680,035 B2 * | 3/2010 | Krishnan | 370/229 |
| 7,720,980 B1 * | 5/2010 | Hankins et al. | 709/229 |
| 2002/0075844 A1 * | 6/2002 | Hagen | 370/351 |
| 2002/0110084 A1 * | 8/2002 | Butt et al. | 370/230 |
| 2002/0112039 A1 * | 8/2002 | Ullman | 709/223 |
| 2003/0088609 A1 * | 5/2003 | Guedalia et al. | 709/107 |
| 2003/0103450 A1 * | 6/2003 | Chapman et al. | 370/229 |
| 2004/0221032 A1 * | 11/2004 | Bernstein et al. | 709/224 |
| 2005/0083973 A1 * | 4/2005 | Krishnan | 370/468 |
| 2005/0086338 A1 * | 4/2005 | Krishnan | 709/223 |
| 2005/0086339 A1 * | 4/2005 | Krishnan | 709/223 |
| 2005/0108422 A1 * | 5/2005 | Krishnan | 709/233 |
| 2005/0111489 A1 * | 5/2005 | Krishnan | 370/468 |
| 2005/0243862 A1 * | 11/2005 | Krishnan | 370/468 |
| 2006/0168239 A1 * | 7/2006 | Gauthier | 709/227 |
| 2006/0233108 A1 * | 10/2006 | Krishnan | 370/235 |
| 2007/0091811 A1 * | 4/2007 | Thubert et al. | 370/238 |
| 2007/0263553 A1 * | 11/2007 | Bharali et al. | 370/254 |
| 2008/0310407 A1 * | 12/2008 | Sewall et al. | 370/381 |

* cited by examiner

*Primary Examiner* — Hassan Kizou
*Assistant Examiner* — Emmanuel Maglo

(57) ABSTRACT

This invention describes a method to limit the number of concurrent discovery processes into networks based upon the network traffic volume and discovery duration per device.

14 Claims, 9 Drawing Sheets

| Device (OS) Type | Min[KB] | Max [KB] | Average [KB] |
|---|---|---|---|
| Windows 2000, XP (client) | 910 | 2210 | 1560 |
| Windows 2000, 2003 (server) | 1210 | 2810 | 2010 |
| Windows NT 4.0 (client & server) | 1310 | 3510 | 2410 |
| Unix Systems | 810 | 2010 | 1410 |
| Switches and Routers | 710 | 2010 | 1360 |

Fig. 3

| Network Name | Network Link Speed | Number of Devices | Avg. Discovery Duration [s] | Avg. Transfer Volume [Kbyte] |
|---|---|---|---|---|
| Data Center | 100 Mbits/s | 75 | 60 | 1935 |
| Branch Office 1 | 512 Kbits/s | 120 | 120 | 1750 |
| Branch Office 2 | 128 Kbits/s | 50 | 180 | 1750 |

THROTTLING NETWORK TRAFFIC GENERATED BY A NETWORK DISCOVERY TOOL DURING A DISCOVERY SCAN

CROSS REFERENCE TO RELATED APPLICATIONS

This Application claims the benefit of provisional patent application Ser. No. 61/059,925, filed Jun. 9, 2008, titled "Throttling Network Traffic Generated By A Network Discovery Tool During A Discovery Scan," which application is incorporated by reference herein as if reproduced in full below.

FIELD OF THE INVENTION

The present invention relates generally to the field of network discovery tools.

BACKGROUND OF THE INVENTION

Network discovery tools are an important part of managing or administrating a network. They are utilized to scan for devices on the network within a specific IP range. Network discovery tools generally run on Local Area Networks (LANs), and other networks such as Wide Area Networks (WANs). WAN networks are typically used in geographically distributed networks. These tools are utilized to obtain information about all of the devices on the network. A network discovery tool can also alert you to rogue devices that are tapping into network resources, data leaks, and so forth. A LAN typically supports link speeds anywhere from 10 Mbit/s to 10 Gbit/s. A WAN typically supports link speeds anywhere from 128 Kbit/s to 1 Gbit/s. Prior art discovery tools either do not take into account bandwidth limitations, or set a global bandwidth limit for all networks.

Thus, there is a need in the art for an improved discovery tool.

SUMMARY OF THE INVENTION

One embodiment of the invention relates to a system for discovering devices in a network, comprising at least one subnetwork and a limiter for limiting an amount of bandwidth utilized for discovery process into each subnetwork.

Another embodiment of the invention relates to a method of discovering devices in a network, comprising determining a bandwidth limit for discovery processes and limiting an amount of bandwidth utilized for discovery process into each subnetwork in the network.

Another embodiment of the invention relates to a system for discovering devices in a network, comprising means for maintaining at least one subnetwork and means for limiting an amount of bandwidth utilized for discovery process into each subnetwork.

BRIEF DESCRIPTION OF THE DRAWINGS

FIG. 3 is an exemplary table of network statistics.

DETAILED DESCRIPTION OF THE PREFERRED EMBODIMENTS

Figure 1:
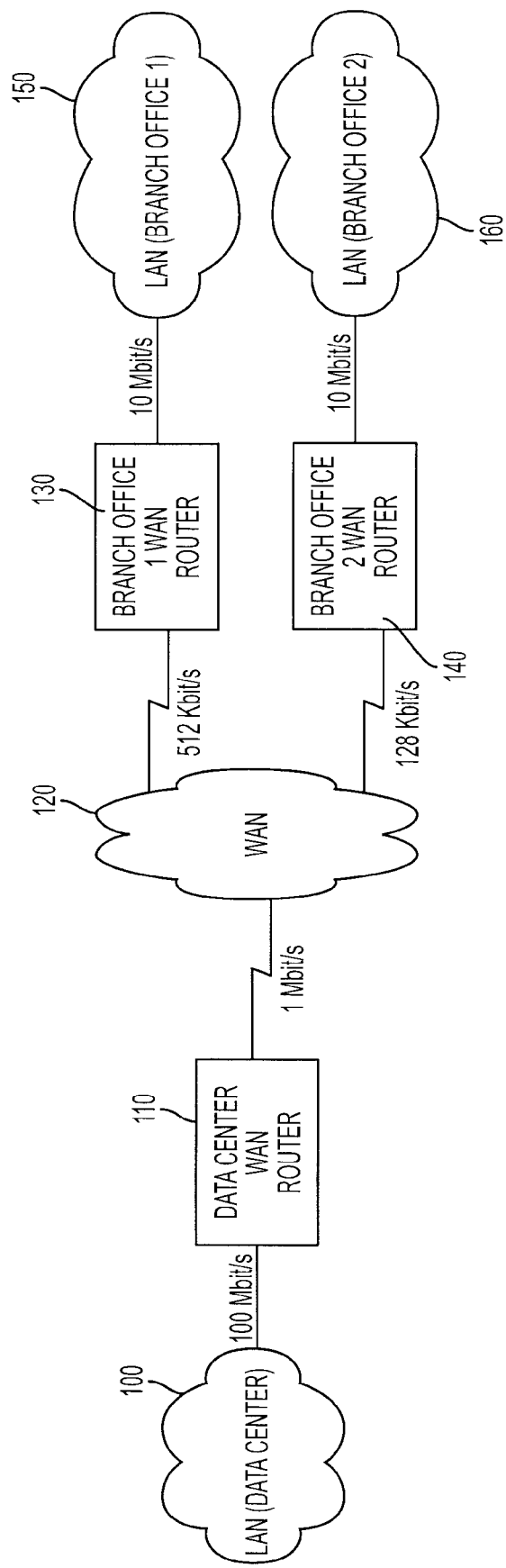
FIG. 1 is a diagram of one embodiment of the invention.

A network discovery tool, in one embodiment, generates additional network traffic while scanning devices on the network. FIG. 1 details a typical corporate network that would utilize a network discovery tool. The network contains a Data Center LAN 100, a Data Center WAN Router 110, a WAN 120, a Branch Office 1 WAN Router 130, a Branch Office 2 WAN Router 140, a LAN (for Branch Office 1) 150 and a LAN (for Branch Office 2) 160. The Data Center LAN 100 contains a server (not pictured) that runs a discovery tool for the network. The discovery traffic into the Branch Offices 1 and 2 will go from the Data Center WAN Router 110 to the WAN 120 and through the Branch Office WAN Routers 130 and 140. In one embodiment, the WAN 120 may support a link speed of 1 Mbit/s. In one embodiment, the Branch Office WAN routers 130 and 140 may support link speeds of 128 kbit/s.

In one embodiment, when a device has been discovered, the discovery process creates or updates a record for the device in a database with the actual discovery duration [seconds] and the network traffic volume [Bytes], which has been transferred to and from the device. In one embodiment, a packet capture library such as WinPcap may be utilized to obtain this information. In another embodiment, another device could be placed in the network that gathered statistics. For example, a sniffer tool could be placed between network segments or on a specific network segment, and could obtain statistics based upon IP address. Examples of statistics are detailed below, in conjunction with FIGS. 2 and 3. In this embodiment, a discovery server could then pull the statistics from this device. In another embodiment, the discovery server could obtain these statistics from routers in the network. In another embodiment, the NIC card of the server could be configured to capture and receive information based on every network segment. In this embodiment, a packet capture library could configure the adapter to be in a capture or pernicious mode by setting it to capture such packet information. The discovery server could then access the packet capture library to obtain a packet count for each and every address in the network, as well as a volume for each packet counted.

Other statistics could potentially be calculated based upon obtained information. In one embodiment, an average network transfer bandwidth is calculated by dividing the average network transfer volume by the average discovery duration. Other statistics could also be calculated from obtained values. The method by which this information is obtained, and the types of statistics calculated or obtained from the method, is not limiting on the invention.

Figure 2:
FIG. 2 is an exemplary table of discovery traffic statistics.

FIG. 2 depicts a table of exemplary traffic statistics. A Device Type 200 is displayed, as well as the minimum discovery traffic volume 210 for the device, the maximum discovery traffic volume 220 for the device, and the average discovery traffic volume 230 for the device. The statistics could be created, in one embodiment, by a tool such as HP asset. The table includes the volume of traffic it takes to discover systems on a network that include Windows 2000 XP client, Windows 2000, 2003 server, Windows NT client and server, UNIX, switches and routers. This embodiment is based upon the network described in FIG. 1. A server in the Data Center LAN 100 is running a discovery tool.

In the course of discovery of every device in the network, statistics are obtained that measure transfer volume and discovery time for every system. Exemplary volumes utilized by different types of operating systems are depicted in FIG. 2. Average traffic volume 230 is calculated, and then utilized to determine link bandwidth and how much bandwidth to set aside for discovery of devices.

In one embodiment, a windows XP computer is discovered to be located in Branch Office 2. As shown in FIG. 2, the average traffic volume utilized to discover a Windows XP computer in Branch Office 2 is calculated to be 12,480 Kb, based upon the minimum 210 and maximum 220 values recorded. The average discovery time for discovering this Windows XP computer is recorded to be 3 minutes. Thus, the average network bandwidth utilization during a 3 minute timeframe is calculated to be:

$$12480 \text{ [Kbit]}/3 \text{ [min]} * 60 \text{ [s/min]} = 69 \text{ [Kbit/s]}$$

The discovery of this single Windows XP computer in Branch Office 2 will utilize the 128 Kbit/s link in the Branch Office 2 WAN Router with 69 Kbit/s for 3 minutes. If only one more device in Branch Office 2 would be discovered at the same time, the network connection from the Data Center into Branch Office 2 would be fully congested during this time. Thus, the invention in one embodiment provides throttling of the discovery mechanism that can be customized for each specific network. This throttling serves to ensure that the network links maintain a guaranteed bandwidth for discovery, with bandwidth available for other purposes.

FIG. 3 depicts the network statistics described above for the entire network, detailing more statistics obtained during the discovery process. The Network Name 300 is displayed, as well as the network link speed 310, the number of devices in the network 320, the average discovery duration for the network 330, and the average transfer volume for the network 340. The invention utilizes these value to dynamically adjust the number of concurrent discovery processes into each network. The advantages of such adjustment include speeding up the overall discovery process and avoiding network congestion and user disturbance. The invention utilizes a maximum bandwidth for concurrent discovery processes for each network to dynamically adjust the number of concurrent discovery processes into each network.

Figure 4:
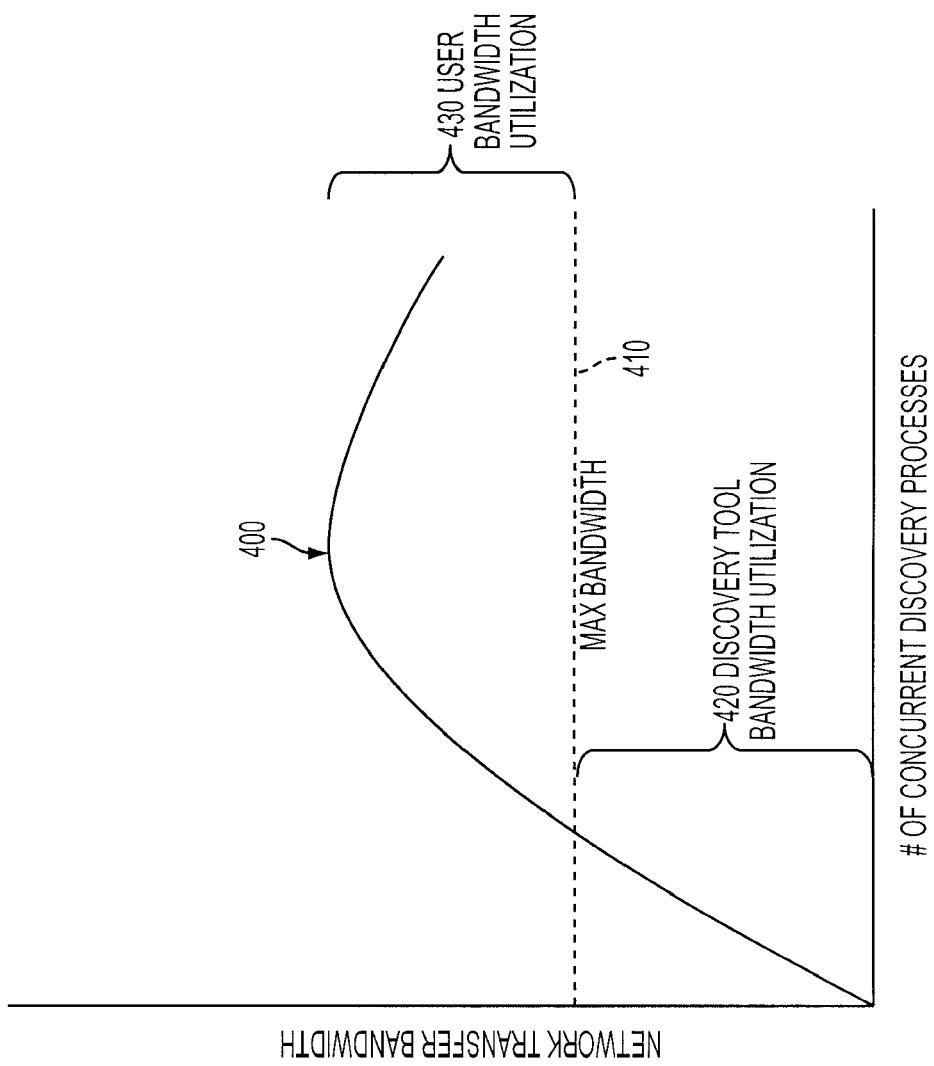
FIG. 4 is a graph detailing the relationship between bandwidth and processes.

FIG. 4 is a diagram that shows a relationship between the number of concurrent discovery processes and the effective network transfer bandwidth. A discovery process represents an actual execution of discovering a device on the network. In many embodiments, a discovery thread and discovery process can be considered to have the same effect.

As shown in the diagram, the effective network transfer bandwidth increases with every new concurrent discovery process. However, the effective network bandwidth reaches a peak once the network link gets close to its congestion point 400 due to the running of many concurrent threads. In some embodiments, depending on the network technology, the effective network transfer bandwidth even drops with a further increased number of discovery threads. For example, in an Ethernet realm, the effective network transfer bandwidth would drop with a further increased number of discovery threads. FIG. 4 also shows the maximum bandwidth for concurrent discovery processes 410, the bandwidth utilization of the discovery tool 420, and the bandwidth utilization of "users" of the network 430.

As mentioned above, network related parameters, such as number of devices, average discovery duration and average transfer volume can be collected during the discovery process. However, determining a maximum transfer bandwidth into a network can be a much more difficult process. In one embodiment, if all routers, switches and other network equipment (including all interfaces) along the trace-route path (forward and backward) from the data center into all branch office networks would be known, a static link speed analysis could provide the maximum link speed for the all network paths into all branch offices. This embodiment takes a theoretical approach. Although it may yield the most accurate maximum transfer bandwidth results, in some embodiments, all of the information needed is not known.

In another embodiment, the maximum transfer bandwidth is manually set via a user interface. In one embodiment, this interface could be associated with a branch office or a corporate office. In another embodiment, the interface with be associated with a distinct link bandwidth. The association of the interface is not limiting on the invention. A network administrator, or other authorized person, could utilize the interface to provide settings information. In most embodiments, there is no general equation relating to the maximum transfer bandwidth. Rather, it is often network specific. The network saturation point often depends upon the network technology and its parameters. For example, the saturation point depends upon the protocols the network uses, whether the network is in a full-duplex or half-duplex mode, and the available link bandwidths, to name a few. In most embodiments, network administrators are familiar with the various network technologies, and utilize their knowledge to set the initial maximum transfer bandwidth for each network. In one embodiment, for an Ethernet realm, a network administrator could utilize the backoff time that a client can send packets after a collision to determine the saturation point of the network. In this embodiment, the saturation point drops because of the backoff.

As mentioned above, network administrators know rather well what networks (by address and subnet mask) are connected by LAN (high-speed) or WAN (low-speed) links as each network is usually associated with a country/location/site/building. Once the maximum transfer bandwidth into each network is known or well educated assumptions have been provided, the discovery tool can use these values to limit the number of discovery processes (threads) into each network at any time to avoid congestion of WAN links and user disturbance. In one embodiment, maximum transfer bandwidth could be utilized to limit the number of concurrent discovery processes into each network. In another embodiment, a percent ratio could specify how much of the maximum link speed a discovery tool is permitted to utilize at the maximum. For example, a percent ratio could be set at 50%. In another embodiment, both of these values, the maximum transfer bandwidth and the percent ratio, can be taken into account. In another embodiment, there may not be any such limit specific for a network. In this embodiment, the discovery tool does not need to limit the number of concurrent discovery processes into that network.

Calculating statistically meaningful average transfer volume and discovery duration for a particular network requires a reasonable number of devices in the network that is being discovered. If a network is discovered for the very first time, then there are no records of prior average transfer volume and discovery duration available. In this situation, in one embodiment, the number of concurrent discovery processes for that network will be set to 1. Once the network has been discovered, and an average transfer volume for the network is able to be calculated, the number of concurrent discovery processes can be adjusted according to the maximum transfer bandwidth into the network. In one embodiment, the number of concurrent discovery processes is only adjusted after a statistically meaningful average transfer volume for the network has been calculated. In another embodiment, the number of concurrent discovery processes can be adjusted according to the configured maximum transfer bandwidth into the network and also take into account a maximum utilization ratio (or percent ratio). This embodiment could potentially be utilized as a type of global policy for the discovery tool configuration. In one embodiment, a limiting number of concurrent discovery processes could be determined, for example, by a fixed percentage of devices (based on IP address) that have been discovered relative to the number of available IP addresses in the network. For example, in this embodiment, a reasonable number of concurrent threads could be determined after discovering a fixed percentage (5%) of the devices based upon available IP addresses.

Figure 5:
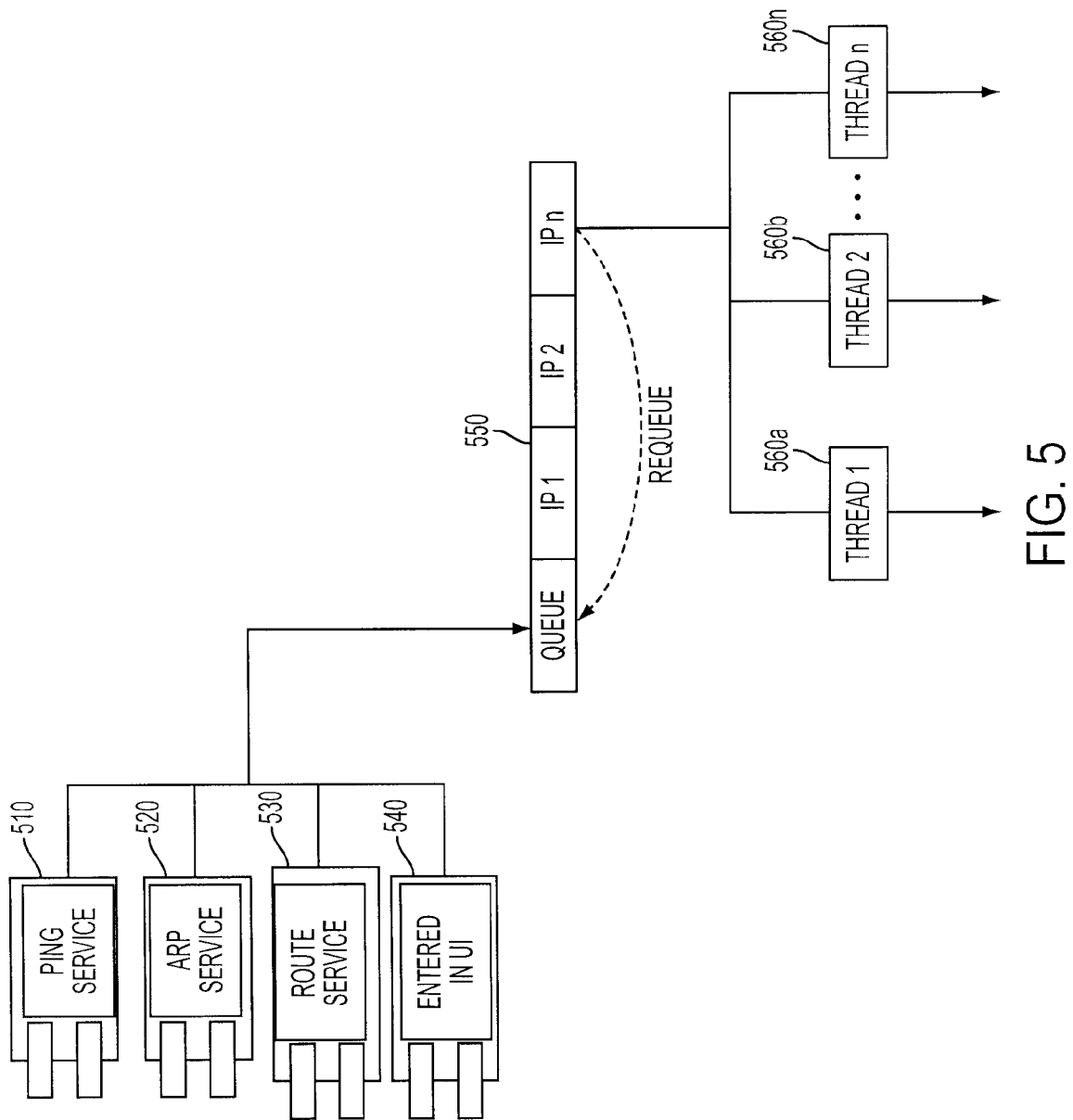
FIG. 5 is a schematic diagram of one embodiment of the invention.

FIG. 5 depicts a relationship between IP addresses waiting for discovery in a network, and the discovery processes that are running or are queued to run, that actually execute the discovery of a single device in the network (per its IP address). FIG. 5 includes a Ping Service 510, an ARP service 520, a Route Service 530 and a Manual Entry Service via a User Interface 540. These services are utilized to discover devices in the network. The usage of these services for discovery purposes is known in the art. The types of services and method of discovery utilized are not limiting on the invention.

As shown in FIG. 5, these services are utilized in discovering devices. The discovery of devices is processed based upon their IP addresses. FIG. 5 also shows a queue 550, with a list of IP addresses, IP1, IP2, IPn, and so forth. Depending upon bandwidth limits, threads 560a to 560n are issued. Each thread discovers one device by passing the IP address along the chain of the configured discovery services.

Figure 6:
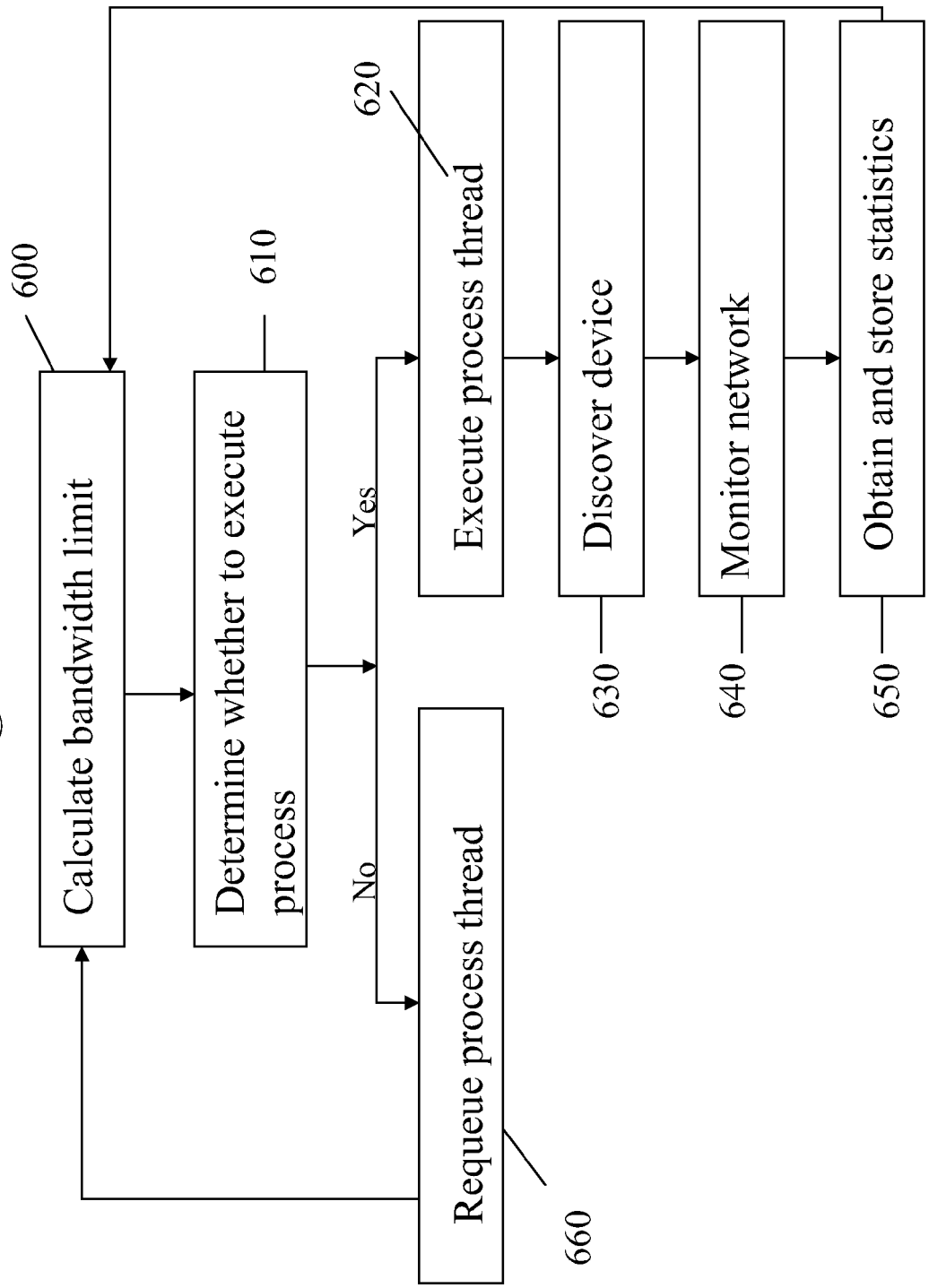
FIG. 6 is a flowchart depicting one embodiment of the invention.

FIG. 6 shows an embodiment of the invention. Specifically, FIG. 6 shows a method of discovering devices in the network. Whenever there is a thread available the discovery queue will forward an IP address from the queue to the thread. Based upon the maximum transfer bandwidth value, and also potentially the amount of devices to be discovered, a bandwidth limit for discovery is calculated in step 600. By way of example, this calculation could comprise determining a specific percentage of the maximum transfer bandwidth value to set as the bandwidth limit for discovery. Based upon this bandwidth limit, the invention decides whether issuing a process thread to discover another device would utilize more bandwidth than the bandwidth limit in step 610. If issuing the thread does not surpass the bandwidth limit (branch "Yes"), the process thread is executed in step 620. In one embodiment, the process thread discovers one device by passing the IP address along the chain of the configured discovery services 640. Statistics are obtained from the discovery process and stored in step 650. In one embodiment, the discovery process thread runs the entire discovery process for the IP address, gets information regarding discovery and the state of the network, updates the network and traffic statistics, and stores the information in a database. These statistics can be utilized to update the bandwidth limit. If the bandwidth limit would be surpassed by executing the discovery process thread (branch "No"), the IP address is requeued in step 660. In one embodiment, if the IP address (from the queue) points to a network that is already close to its configured maximum transfer bandwidth, the IP address is requeued for later processing. Control then returns to step 600 to continue discovering the network.

Figure 7:
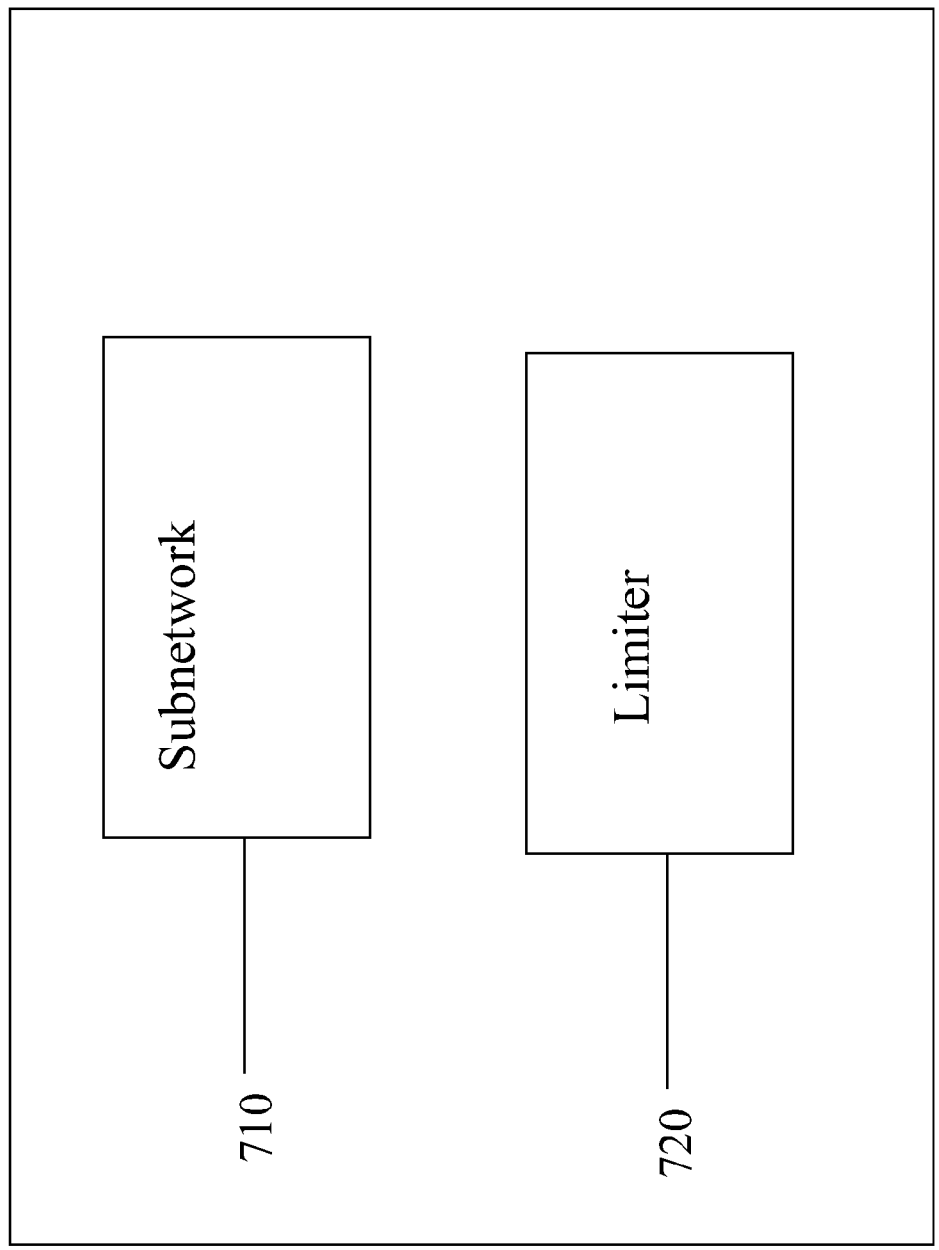
FIG. 7 is a diagram of one embodiment of the invention.

FIG. 7 depicts another embodiment of the invention. Specifically, FIG. 7 depicts a system for discovering devices in a network, including at least one subnetwork 710 and a limiter 720 for limiting the amount of bandwidth utilized for discovery process into each subnetwork 710. A subnetwork could be considered to be any part of the network, including the network as a whole, or specific portions of the network. For example, with regards to FIG. 1, a subnetwork could be viewed as the whole network displayed, or as the network from the WAN to the Branch Office 1, to name a few.

Figure 8:
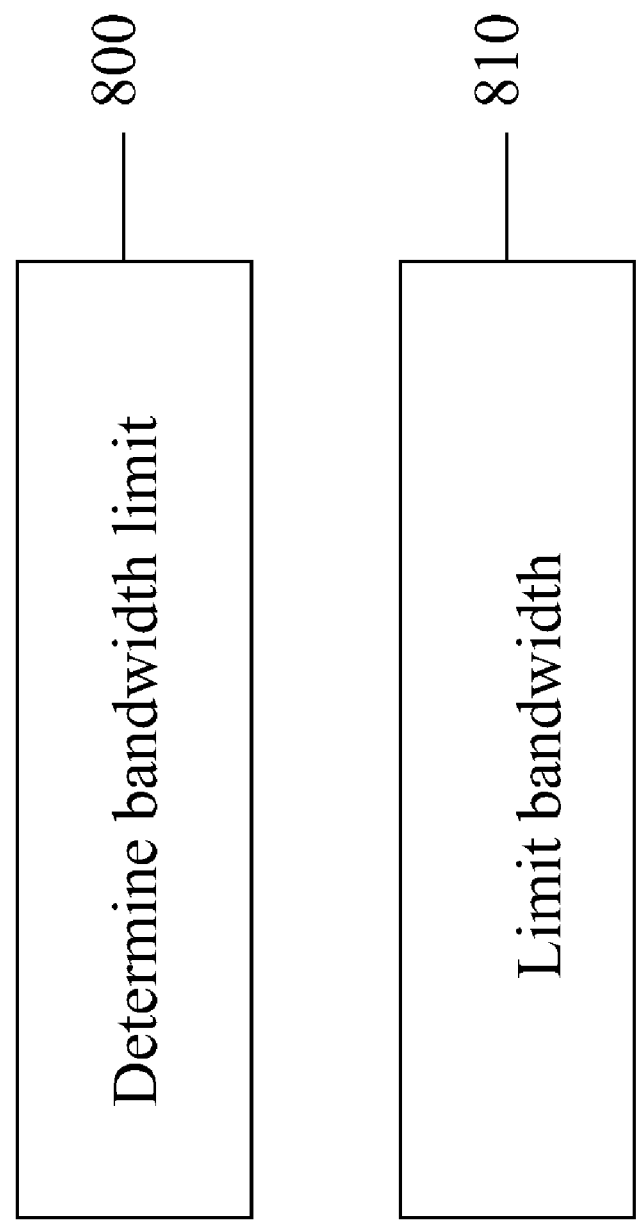
FIG. 8 is a flowchart depicting one embodiment of the invention.

FIG. 8 depicts another embodiment of the invention. Specifically, FIG. 8 depicts method of discovering devices in a network, comprising the steps of determining a bandwidth limit for discovery processes 800 and limiting 810 the amount of bandwidth utilized for discovery process into each subnetwork in the network.

Figure 9:
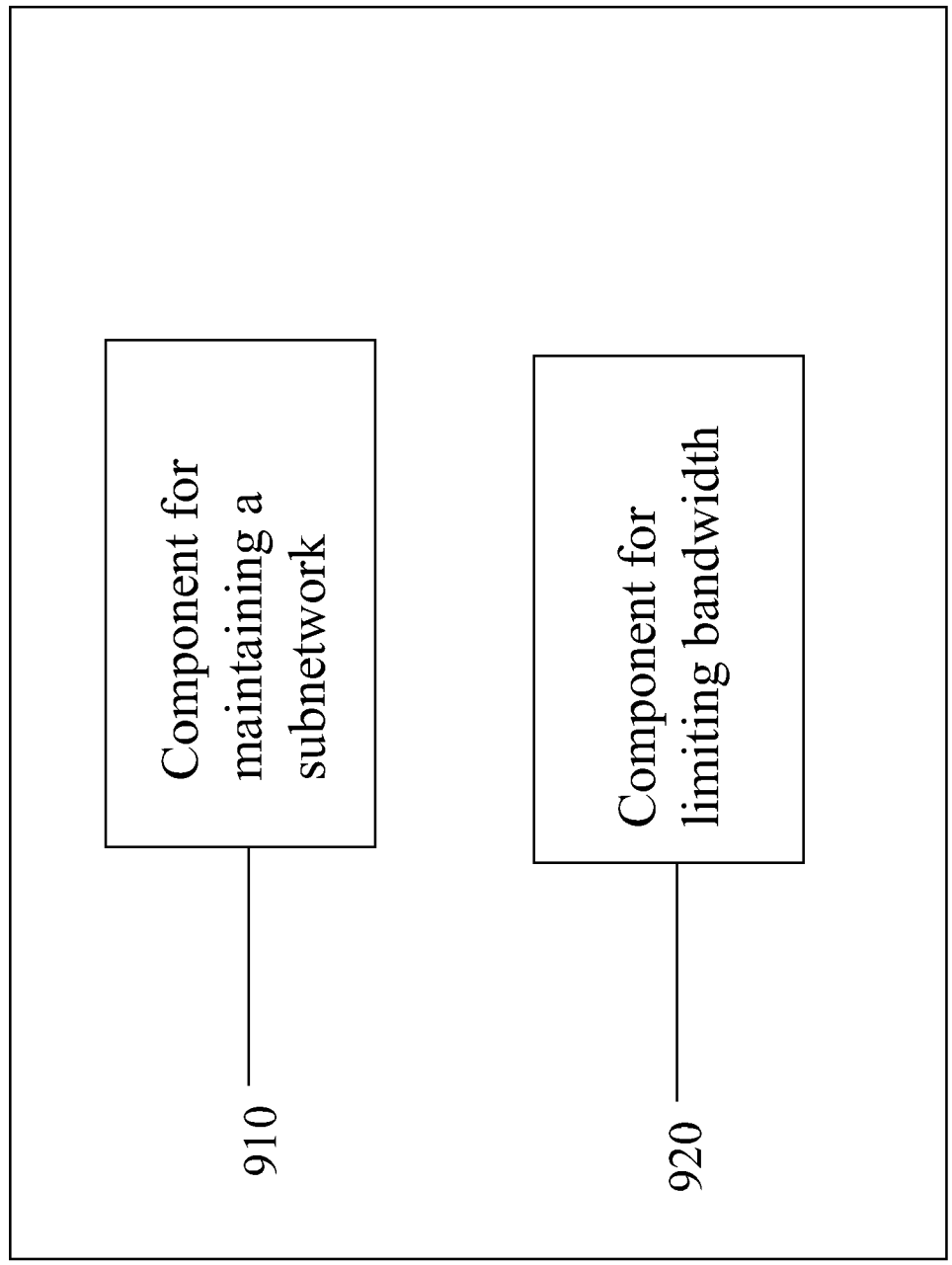
FIG. 9 is a diagram of one embodiment of the invention.

FIG. 9 depicts another embodiment of the invention. Specifically, FIG. 9 depicts a system for discovering devices in a network, including a component 910 for maintaining at least one subnetwork and a component 920 for limiting the amount of bandwidth utilized for discovery process into each subnetwork. These components could be any part of the discovery server, a sniffer device, or other implementations as described in detail above.

An exemplary system for implementing the overall system or method or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A system for discovering devices in a network, comprising:
   at least one subnetwork; and
   a limiter for limiting an amount of bandwidth utilized for a discovery process into each subnetwork,
   in which the limiter utilizes a maximum transfer bandwidth into the subnetwork, and in which the limiter utilizes a percent ratio of a maximum link speed that can be utilized for discovery processes.

2. The system of claim 1, further comprising:
a statistics collector for collecting statistics on devices in each subnetwork, and
a limit updater for updating the amount of bandwidth utilized for discovery processes into each subnetwork.

3. The system of claim 1, wherein a discovery process thread is issued as long as the amount of bandwidth required for the discovery process thread does not exceed the amount of bandwidth utilized for discovery processes in the subnetwork.

4. The system of claim 1, further comprising a user interface, in which the maximum transfer bandwidth may be set via the user interface.

5. The system of claim 3, in which if the amount of bandwidth required for the discovery process thread does exceed the amount of bandwidth utilized for discovery processes in the subnetwork, then placing the discovery process in a queue for later processing.

6. A method of discovering devices in a network, comprising:
determining a bandwidth limit for discovery processes;
limiting an amount of bandwidth utilized for discovery process into each subnetwork in the network, and
issuing a discovery process thread as long as the amount of bandwidth required for the discovery process thread does not exceed the amount of bandwidth utilized for discovery processes in the subnetwork,
in which if the amount of bandwidth required for the discovery process thread does exceed the amount of bandwidth utilized for discovery processes in the subnetwork, then placing the discovery process in a queue for later processing.

7. The method of claim 6, wherein the determining step utilizes a maximum transfer bandwidth.

8. The method of claim 6, wherein the determining step utilizes a percent ratio of the maximum link speed that can be utilized for discovery processes.

9. The method of claim 6, further comprising:
collecting statistics on devices in each subnetwork; and
updating the bandwidth limit utilized for discovery processes into each subnetwork.

10. A method of initially discovering devices in a network, comprising:
setting the number of concurrent discovery processes within a subnetwork to 1;
issuing a discovery process thread within the subnetwork; and
adjusting the number of concurrent discovery processes based on a maximum transfer bandwidth into the subnetwork.

11. The method of claim 10, further comprising limiting an amount of bandwidth utilized for subsequent discovery processes into the subnetwork based on the maximum transfer bandwidth into the subnetwork.

12. The method of claim 10, further comprising limiting an amount of bandwidth utilized for subsequent discovery processes into the subnetwork based on a percent ratio of the maximum link speed that can be utilized for discovery processes.

13. The method of claim 10, further comprising:
collecting statistics on devices in the subnetwork, and
updating the amount of bandwidth utilized for discovery processes into the subnetwork.

14. The method of claim 10, further comprising issuing a subsequent discovery process thread as long as the amount of bandwidth required for the subsequent discovery process thread does not exceed the amount of bandwidth utilized for discovery processes in the subnetwork, in which if the amount of bandwidth required for the subsequent discovery process thread does exceed the amount of bandwidth utilized for discovery processes in the subnetwork, then placing the subsequent discovery process in a queue for later processing.

* * * * *

UNITED STATES PATENT AND TRADEMARK OFFICE
CERTIFICATE OF CORRECTION

PATENT NO.         : 8,199,671 B2                        Page 1 of 1
APPLICATION NO.    : 12/241728
DATED              : June 12, 2012
INVENTOR(S)        : Thomas Frietsch et al.

It is certified that error appears in the above-identified patent and that said Letters Patent is hereby corrected as shown below:

In column 7, line 9, in Claim 3, delete "required" and insert -- utilized --, therefor.

In column 7, line 16, in Claim 5, delete "required" and insert -- utilized --, therefor.

In column 7, line 26, in Claim 6, delete "required" and insert -- utilized --, therefor.

In column 7, line 29, in Claim 6, delete "required" and insert -- utilized --, therefor.

In column 8, line 7, in Claim 10, delete "the" and insert -- a --, therefor.

In column 8, line 32, in Claim 14, delete "required" and insert -- utilized --, therefor.

Signed and Sealed this
Eighteenth Day of December, 2012

David J. Kappos
*Director of the United States Patent and Trademark Office*